US 7,570,296 B2

(12) United States Patent  (10) Patent No.: US 7,570,296 B2
Sawachi                    (45) Date of Patent:    Aug. 4, 2009

(54) PHOTOGRAPHING SYSTEM

(75) Inventor: Youichi Sawachi, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 1103 days.

(21) Appl. No.: 10/620,442

(22) Filed: Jul. 17, 2003

(65) Prior Publication Data

US 2004/0021789 A1  Feb. 5, 2004

(30) Foreign Application Priority Data

Aug. 2, 2002  (JP) .............................. 2002-225837

(51) Int. Cl.
H04N 5/222 (2006.01)
(52) U.S. Cl. ......................... 348/333.11; 348/231.2; 348/231.3; 348/333.05; 348/333.12
(58) Field of Classification Search ............. 348/231.2, 348/231.3, 231.6, 333.05, 333.11, 333.12
See application file for complete search history.

(56) References Cited

U.S. PATENT DOCUMENTS

| | | | | |
|---|---|---|---|---|
| 5,068,805 A | * | 11/1991 | Tsuzuki | 345/543 |
| 5,402,170 A | * | 3/1995 | Parulski et al. | 348/211.6 |
| 5,477,264 A | * | 12/1995 | Sarbadhikari et al. | 348/231.6 |
| 5,528,293 A | * | 6/1996 | Watanabe | 348/231.2 |
| 5,724,579 A | * | 3/1998 | Suzuki | 707/104.1 |
| 5,973,734 A | * | 10/1999 | Anderson | 348/239 |
| 6,006,039 A | * | 12/1999 | Steinberg et al. | 396/57 |
| 6,137,534 A | * | 10/2000 | Anderson | 348/222.1 |
| 6,233,010 B1 | * | 5/2001 | Roberts et al. | 348/240.99 |
| 6,288,743 B1 | * | 9/2001 | Lathrop | 348/231.9 |
| 6,429,896 B1 | * | 8/2002 | Aruga et al. | 348/231.99 |
| 6,493,028 B1 | * | 12/2002 | Anderson et al. | 348/222.1 |
| 6,567,119 B1 | * | 5/2003 | Parulski et al. | 348/207.2 |
| 6,661,451 B1 | * | 12/2003 | Kijima et al. | 348/220.1 |
| 6,968,118 B1 | * | 11/2005 | Yamagishi et al. | 386/107 |
| 7,030,914 B2 | * | 4/2006 | Yamagami | 348/231.2 |
| 7,173,660 B2 | * | 2/2007 | Toji et al. | 348/333.02 |
| 7,221,392 B2 | * | 5/2007 | Yoshii | 348/222.1 |

(Continued)

FOREIGN PATENT DOCUMENTS

WO  WO 02/41629  5/2002

OTHER PUBLICATIONS

Japanese Office Action dated May 15, 2007 with English translation.

Primary Examiner—Lin Ye
Assistant Examiner—Chriss S Yoder, III
(74) Attorney, Agent, or Firm—McGinn IP Law Group, PLLC

(57) ABSTRACT

A photographing interval of a digital camera that generates an intermediate image having a resolution between an original image and a thumbnail image is adjusted. Preset intermediate image generation parameters are referenced, and it is determined whether or not generation of an intermediate image is to be carried out. When it is determined that generation of the intermediate image is to be carried out, the intermediate image is generated in a signal processing unit on the basis of the size of the intermediate image set in the intermediate image generation parameters. When it is determined that generation of the intermediate image is not to be carried out, the intermediate image is not generated. Compressed data of the thumbnail image, the original image, and the intermediate image, as well as a header section and a tag section, are stored in a medium such as a memory card.

20 Claims, 5 Drawing Sheets

U.S. PATENT DOCUMENTS 7,227,576 B2 * 6/2007 Umeyama .............. 348/333.11
2001/0002142 A1 * 5/2001 Akiyama et al. ............ 348/222
2001/0041014 A1 * 11/2001 Kaneda ...................... 382/239
2003/0218682 A1 * 11/2003 Lim et al. .............. 348/333.11

* cited by examiner

PHOTOGRAPHING SYSTEM

CROSS-REFERENCE TO RELATED APPLICATION

This application claims priority under 35 USC 119 from Japanese Patent Application No. 2002-225837, the disclosure of which is incorporated by reference herein.

BACKGROUND OF THE INVENTION

1. Field of the Invention

The present invention relates to a digital camera, and in particular to a digital camera that generates an intermediate image having a resolution between an original image and a thumbnail image.

2. Description of the Related Art

A digital camera stores, in a storage medium, an original of an image in which a subject is photographed. In recent years, there have been many digital cameras that include a liquid crystal monitor for verifying images and that display preview images immediately after photographing. Thumbnail images that have a lower resolution than original images are suited for easily displaying images in a short time on such a liquid crystal monitor. For this reason, it has been common to store, in the storage medium, compressed data of the thumbnail and the original of the photographed image as a single file.

However, when the pixel number of a photographing sensor such as a CCD or a CMOS is large, the resolution of the thumbnail image has been insufficient for verifying the photographed focus. An intermediate image having a resolution between the original image and the thumbnail image is effective for achieving this object.

However, the problem arises that the photographing interval becomes long when an intermediate image that has a higher resolution than a thumbnail image is generated and stored in the storage medium per photographing. This is because, in order to generate and display the intermediate image after photographing, the next photographing cannot be carried out during this processing, and it takes a long time until preparation for photographing the next image is finished.

SUMMARY OF THE INVENTION

In order to solve the above-described problem, a digital camera of a first aspect of the present invention comprises: a photographing component for photographing a subject; a setting component for setting whether or not generation of an intermediate image is to be carried out; an intermediate image generating component for generating, when intermediate image generation is set by the setting component, an intermediate image having a resolution between an original image and a thumbnail image; and a storage component for storing an original image photographed by the photographing component and the generated intermediate image.

The digital camera of the present invention presets whether or not generation of the intermediate image is to be carried out. When it is set that generation of the intermediate image is to be carried out, the intermediate image is generated on the basis of that setting. When it is not set that generation of the intermediate image is to be carried out, the intermediate image is not generated. That is, the user can optionally set whether or not to generate the intermediate image. When the intermediate image is not to be generated, the intermediate image is not generated, and because the photographing interval becomes shorter, the user can adjust the time of the photographing interval.

When intermediate image generation is to be carried out, the digital camera of the present invention may generate the intermediate image based on a size, which is set in advance. Thus, similar to the above, the user can adjust the time of the photographing interval. That is, since the setting component may also set a size of the intermediate image, the photographing interval can be shortened even when intermediate image generation is set.

The digital camera of the present invention presets not only whether or not generation of the intermediate image is to be carried out but also presets whether or not generation of a thumbnail image is to be carried out. When it is set that generation of the thumbnail image is to be carried out, the thumbnail image is generated on the basis of that setting. When it is not set that generation of the thumbnail image is to be carried out, the thumbnail image does not have to be generated. Thus, similar to the above, the user can adjust the time of the photographing interval.

Thus, the setting can set not only whether or not generation of the intermediate image is to be carried out but also whether or not generation of the thumbnail image is to be carried out. When the user does not desire that the intermediate image and the thumbnail image be generated, the photographing interval can be further shortened.

A photographing system which is a second aspect of the present invention, comprises a digital camera and a personal computer, wherein the digital camera includes: a photographing component for photographing a subject; a setting component for setting whether or not to generation of an intermediate image is to be carried out; an intermediate image generating component for generating, when intermediate image generation is set by the setting component, an intermediate image having a resolution between an original image and a thumbnail image; a storage component for storing an original image photographed by the photographing component and the generated intermediate image; and a communicating component for communicating with the personal computer, with the personal computer setting the setting component via the communicating component.

A method for photographing with a digital camera of a third embodiment of the present invention comprises the steps of: (a) photographing a subject; (b) setting whether or not generation of an intermediate image is to be carried out; (c) generating an intermediate image having a resolution between an original image and a thumbnail image when intermediate image generation is set; and (d) storing the photographed original image and the generated intermediate image.

The digital camera of the present invention presets whether or not generation of the intermediate image is to be carried out. When it is set that generation of the intermediate image is to be carried out after image photographing, the intermediate image is generated on the basis of that setting. When it is not set that generation of the intermediate image is to be carried out, the intermediate image is not generated. Therefore, the effect is obtained that the user can adjust the time of the photographing interval by setting that the intermediate image is not to be generated.

DETAILED DESCRIPTION OF THE INVENTION

An embodiment of the present invention will be described below with reference to the drawings.

Figure 1:
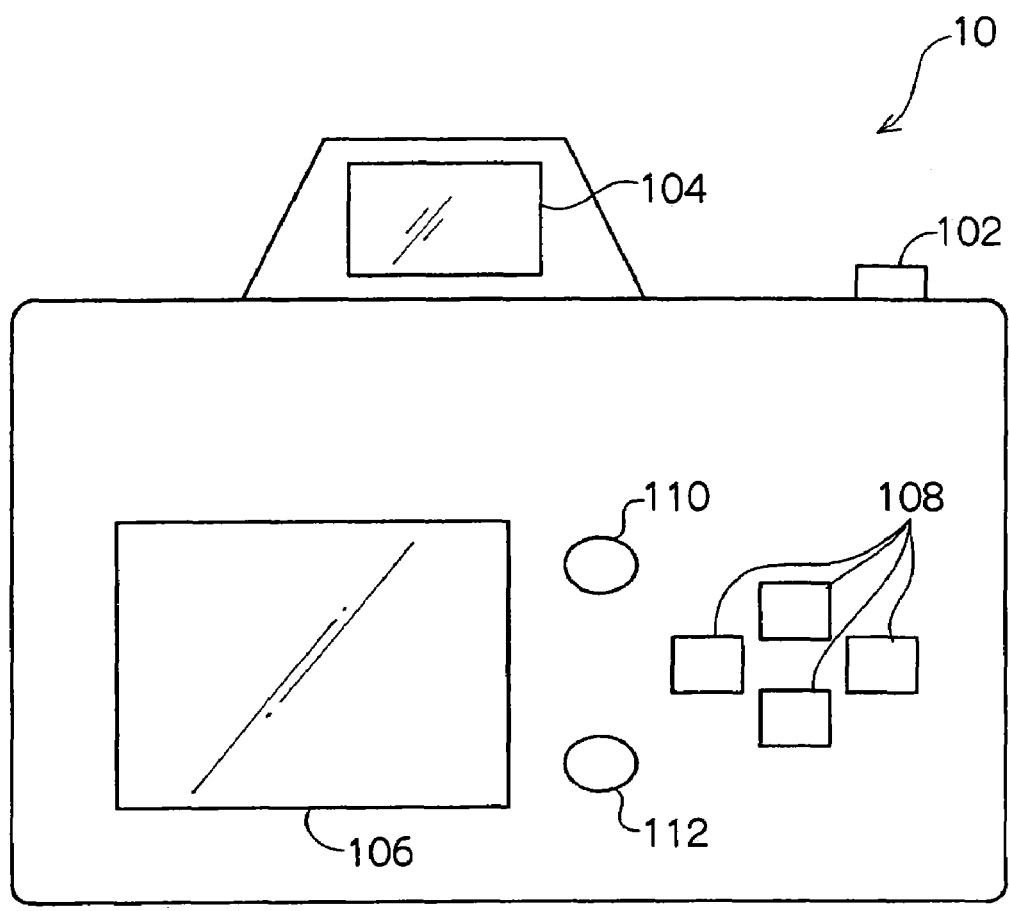
FIG. 1 is a rear view of a digital camera in an embodiment of the present invention.

FIG. 1 is a rear view of a digital camera 10 pertaining to the embodiment of the present invention. The digital camera 10 includes a release button 102 that is pressed down when an image is photographed, a viewfinder 104 for viewing a subject, a liquid crystal monitor 106 for displaying photographed images and menu screens, operation buttons 108 for selecting photographed images and menu screen items displayed on the liquid crystal monitor 106, a menu/execution button 110 for setting the selected photographed images and menu screen items, and a cancel button 112 for canceling operations. The release button 102 forms part of a photographing component, and the operation buttons 108 and the menu/execution button 110 form part of a setting component.

Figure 2:
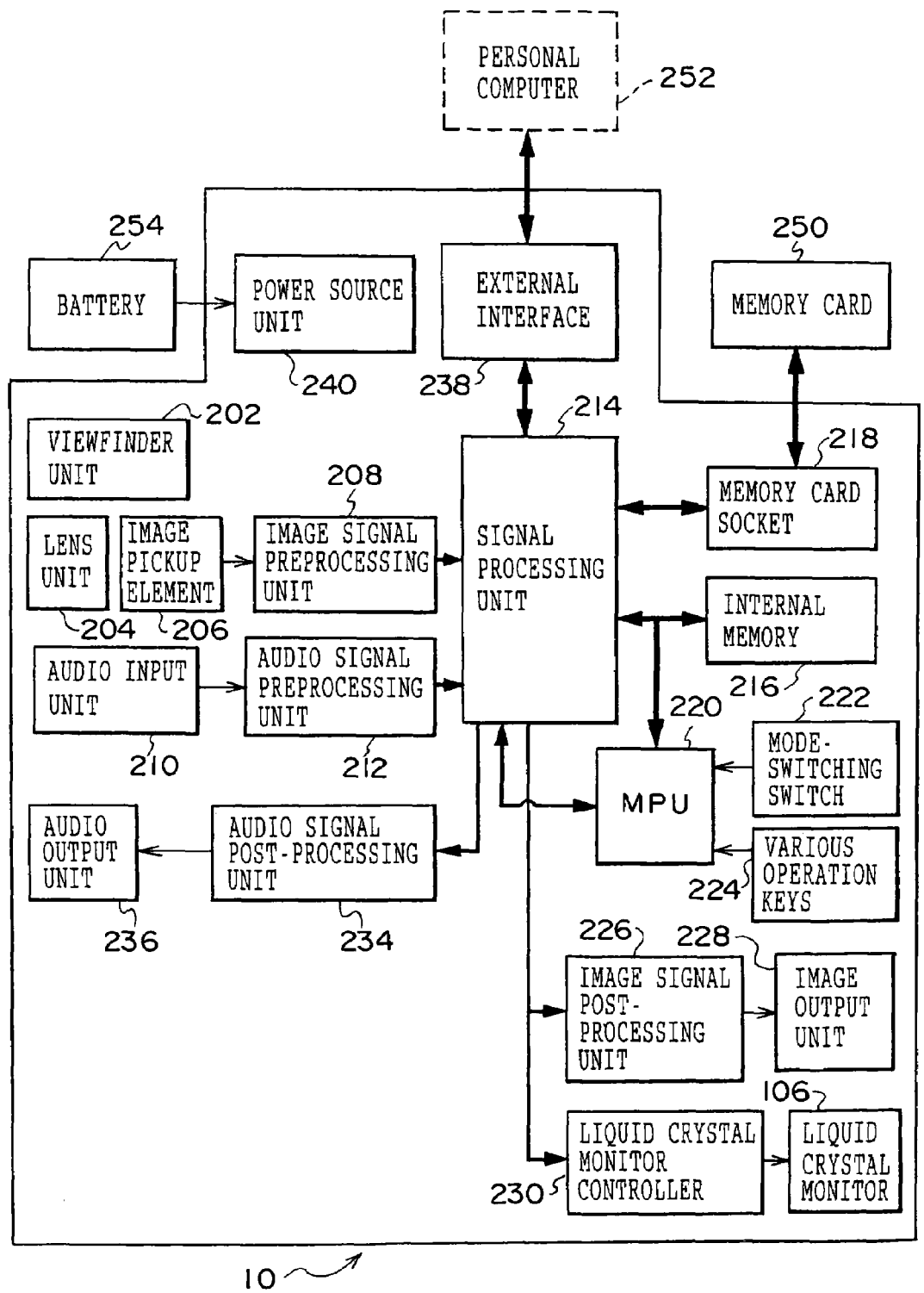
FIG. 2 is a block diagram showing the configuration of the digital camera in the embodiment of the present invention.

FIG. 2 is a block diagram showing the internal configuration of the digital camera 10 pertaining to the embodiment of the present invention. The digital camera 10 includes a viewfinder unit 202 including the viewfinder 104, a lens unit 204, an image pickup element 206, an image signal preprocessing unit 208, an audio input unit 210 configured by a microphone, an audio signal preprocessing unit 212, a signal processing unit 214 for implementing respective processing of intermediate image generation and thumbnail image generation, an internal memory 216, a memory card socket 218, an MPU 220, a mode-switching switch 222, various operation keys 224 including the operation buttons 108, an image signal post-processing unit 226, an image output unit 228, a liquid crystal monitor controller 230, the liquid crystal monitor 106, an audio signal post-processing unit 234, an audio output unit 236, an external interface 238 that serves as a communicating component, and a power source unit 240.

The viewfinder unit 202 is used in order for a user to view a subject, and the lens unit 204 forms an image of light beams from the subject onto the image pickup element 206. The image signal preprocessing unit 208 carries out sampling and analog/digital conversion of a signal received from the image pickup element 206. The audio signal preprocessing unit 212 carries out sampling and analog/digital conversion of an audio signal that the audio input unit 210, such as the microphone, receives.

The signals processed by the image signal preprocessing unit 208 and the audio signal preprocessing unit 212 are sent to the signal processing unit 214, where processing such as compression, extension, file creation, encryption, and decryption is carried out. The processed signals are stored in the internal memory 216. The processed image signal may be displayed on the liquid crystal monitor 106 via the liquid crystal monitor controller 230 that controls the liquid crystal monitor 106, or may be outputted to an external display via the image output unit 228, such as a video terminal, after digital/analog conversion and amplification processing has been carried out by the image signal post-processing unit 226. The processed audio signal may be outputted to the audio output unit 236, such as a speaker, after digital/analog conversion has been carried out by the audio signal post-processing unit 234.

The processed signals are stored in a memory card 250, which is a storage component, removably loaded in the memory card socket 218. The signals can be transmitted and received between an external device, such as a personal computer 252, and the digital camera 10 via the external interface 238, such as a USB or an IEEE1394. This processing is controlled by the signal processing unit 214.

The states of the various operation keys 224, including the operation button 108, the menu/execution button 110 and the cancel button 112, and the mode-switching switch 222 that switches the modes of the liquid crystal monitor 106, such as photographing (liquid crystal viewfinder), image playback, and menu display, are sent to the signal processing unit 214 via the MPU 220, which controls the signal processing unit 214, and reflected in signal processing in the signal processing unit 214. The power source unit 240 supplies power from an external battery 254 to the digital camera 10.

Figure 3:
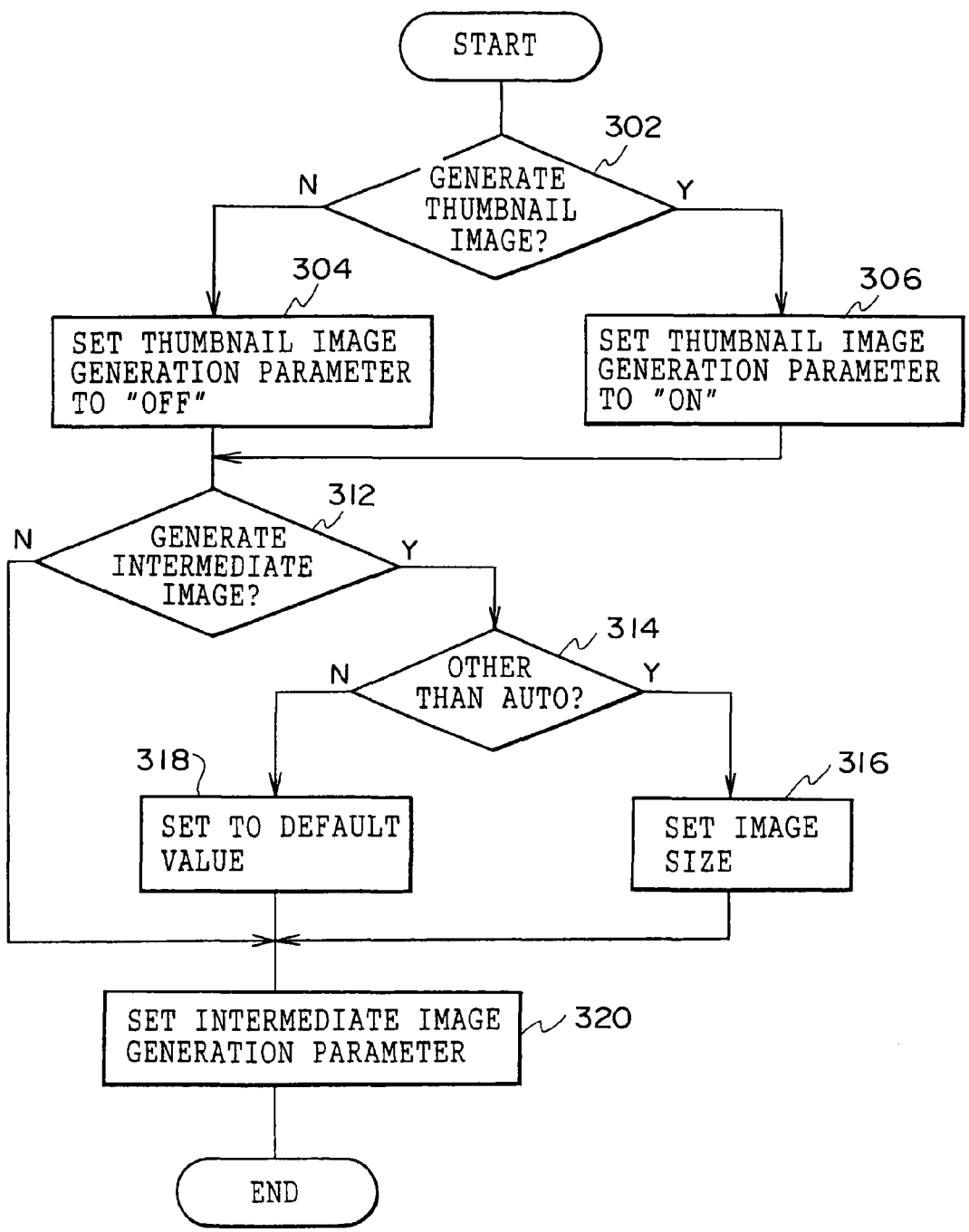
FIG. 3 is a flow chart showing thumbnail image setting processing and intermediate image setting processing in the embodiment of the present invention.

FIG. 3 is a flow chart showing thumbnail image setting processing and intermediate image setting processing. By pressing the menu/execution button 110 down, a setup menu is displayed on the liquid crystal monitor 106. Processing is initiated by selecting, with the operation buttons 108 and the menu/execution button 110, thumbnail image setting and intermediate image setting items from the setup menu.

In step 302, it is determined whether or not it has been set that generation of a thumbnail image is to be carried out. By selecting one of "ON" or "OFF" with respect to an "add thumbnail" menu item, it is possible to carry out setting of whether or not generation of the thumbnail image is to be carried out. When "OFF" is selected (i.e., when it has been set that the thumbnail image is not to be generated), the processing proceeds to step 304, where "OFF", which represents that the thumbnail image is not to be generated, is set as a parameter of thumbnail image generation. When "ON" is selected (i.e., when it has been set that the thumbnail image is to be generated), the processing proceeds to step 306, where "ON", which represents that the thumbnail image is to be generated, is set as a parameter of thumbnail image generation.

In step 312, it is determined whether or not it has been set that generation of an intermediate image is to be carried out. By selecting one of "ON" or "OFF" with respect to an "add intermediate image" menu item, it is possible to carry out setting of whether or not generation of the intermediate image is to be carried out. When "OFF" is selected (i.e., when generation of the intermediate image has not been set), the processing proceeds to step 320, where "OFF", which represents that the intermediate image is not to be generated, is set as a parameter of intermediate image generation, and the processing concludes.

TABLE 1

| ON/OFF | Setting Mode | | | |
| --- | --- | --- | --- | --- |
| | ON | | | OFF |
| Size (Pixels × Pixels) | 1280 × 960 | 960 × 720 | 640 × 480 | AUTO |

When "ON" has been set in step 312 (i.e., when setting of intermediate image generation has been carried out), a menu for carrying out setting of the size of the intermediate image is displayed. That is, an "image size" (e.g., "1280 pixels×960 pixels", "960 pixels×720 pixels", "640 pixels×480 pixels")

menu item including "AUTO" is displayed, and it is possible to select any image size from among the displayed sizes (see Table 1). In step 314, when it has been determined that "AUTO" has been selected, a default intermediate image size is set in step 318 (see Table 2).

As shown in Table 2, the default intermediate image size is preset in accordance with the size of the original image. For example, if the size of the original image is "3200 pixels× 2400 pixels", the default intermediate size is preset to "1280 pixels×960 pixels". If the size of the original image is "2560 pixels×1920 pixels", the default intermediate size is preset to "960 pixels×720 pixels". If the size of the original image is "1920 pixels×1440 pixels", the default intermediate size is preset to "640 pixels×480 pixels". If the size of the original image is "1280 pixels×960 pixels", the default intermediate size is preset to "640 pixels×480 pixels".

TABLE 2

| Original Image Size (Pixels × Pixels) | Intermediate Image Size (Pixels × Pixels) |
| --- | --- |
| 3200 × 2400 | 1280 × 960 |
| 2560 × 1920 | 960 × 720 |
| 1920 × 1440 | 640 × 480 |
| 1280 × 960 | 640 × 480 |

When an item other than "AUTO" has been selected in step 314, the selected intermediate image size is set in step 316. By displaying the image sizes shown in Table 1 ("1280 pixels× 960 pixels", "960 pixels×720 pixels", "640 pixels×480 pixels") on the liquid crystal monitor 106, the size of the intermediate image can be selected from among these. Next, the processing proceeds to step 320, where "ON", which represents that the intermediate image is to be generated, and the size of the intermediate image are set as parameters of intermediate image generation, and processing concludes.

Figure 4:
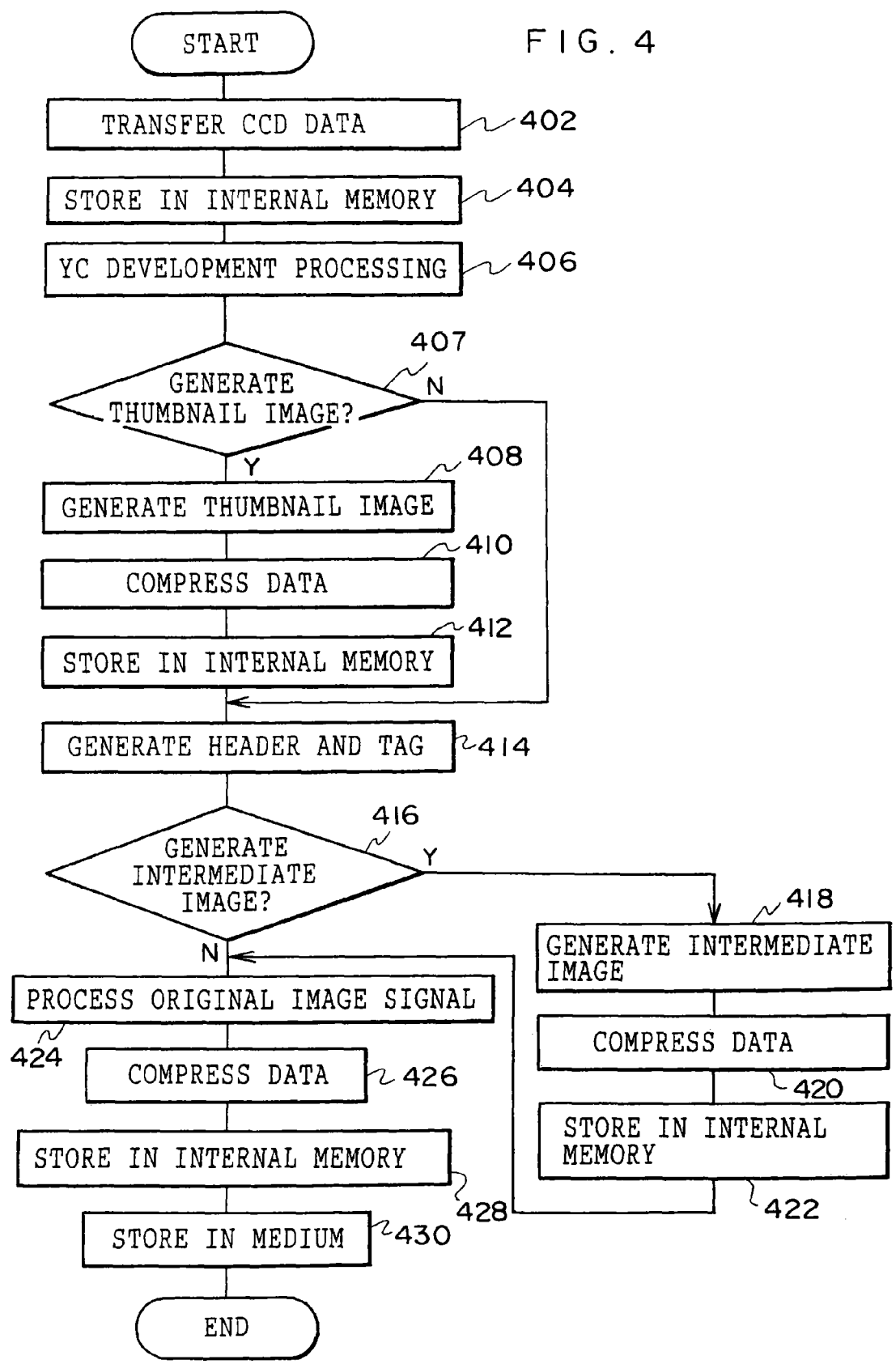
FIG. 4 is a flow chart showing image photographing processing in the embodiment of the present invention.

FIG. 4 is a flow chart showing image photographing processing. Processing is initiated by pressing the release button 102 down. In step 402, the data of the image signal photographed by the image pickup element (CCD) 206 is transferred to the signal processing unit 214 via the image signal preprocessing unit 208. In step 404, the image signal of the original image is stored in the internal memory 216. In step 406, YC development processing of the original image is carried out in the signal processing unit 214.

In step 407, the thumbnail image generation parameter set in step 304 or 306 of FIG. 3 is referenced, and it is determined whether or not generation of the thumbnail image is to be carried out. When it has been determined that generation of the thumbnail image is to be carried out (i.e., when the parameter is set to "ON"), the thumbnail image is generated in step 408 in the signal processing unit 214. The thumbnail image may be generated by sampling pixels at predetermined intervals, or may be generated using any image reduction algorithm.

In step 410, data of the generated thumbnail image is compressed by any reduction algorithm such as JPEG, and the generated thumbnail image is stored in the internal memory 216 in step 412. When it has been determined in step 407 that generation of the thumbnail image is not be carried out (i.e., when the parameter is set to "OFF"), the thumbnail image is not generated.

Figure 5:
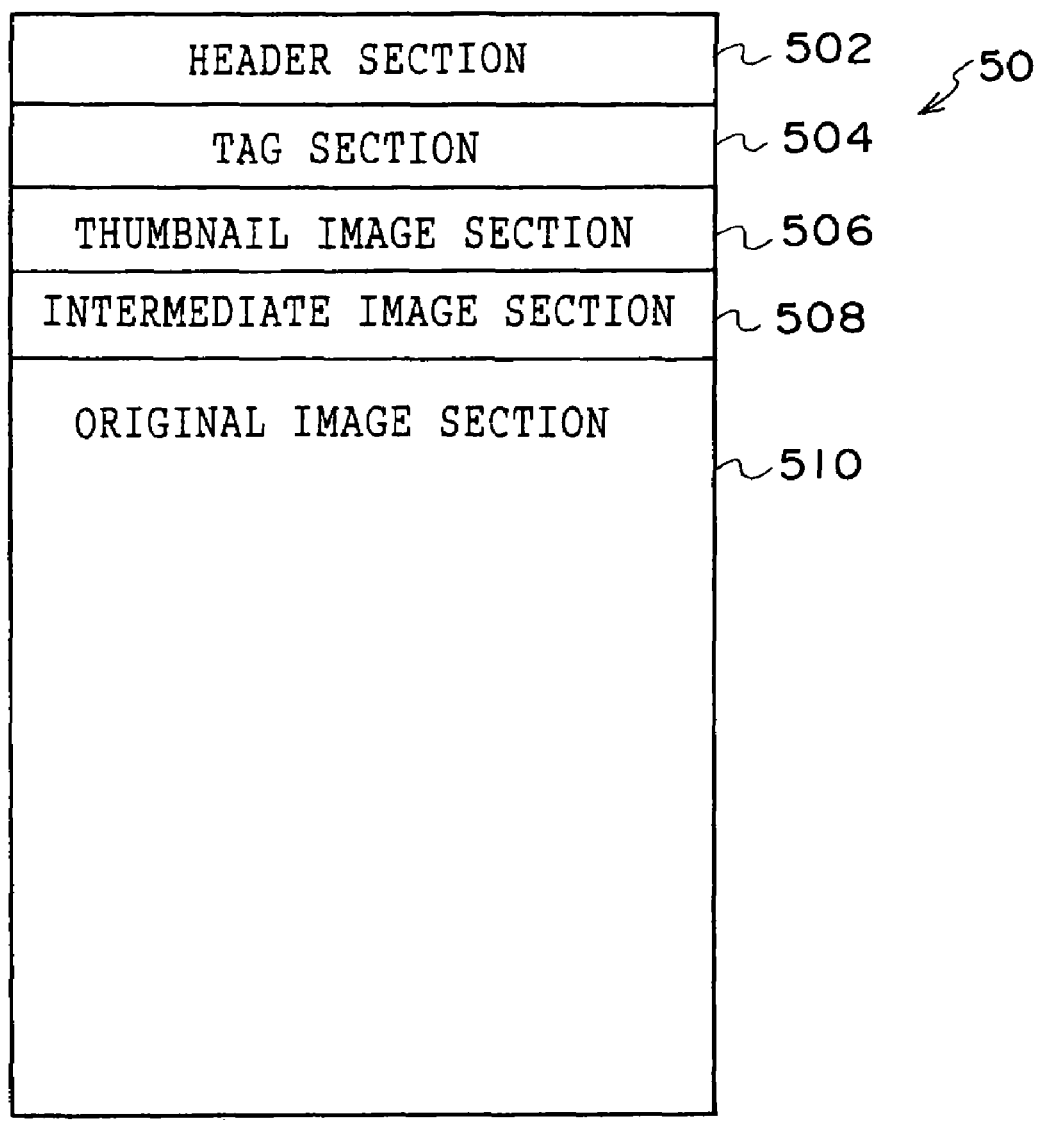
FIG. 5 is a diagram showing the configuration of an image file in the embodiment of the present invention.

In step 414, a header section and a tag section of an image file are generated. An example of data configuration of the image file is shown in FIG. 5. An image file 50 includes a header section 502, a tag section 504, a thumbnail image section 506, an intermediate image section 508, and an original image section 510. The header section 502 and the tag section 504 represent the type (e.g., JPEG, TIFF, etc.), size, content (whether it includes a thumbnail image, an intermediate image, or an original image) of the image(s) included in the image file.

In step 416, the intermediate image generation parameters set in step 320 of FIG. 3 are referenced, and it is determined whether or not generation of the intermediate image is to be carried out. When it has been determined that generation of the intermediate image is to be carried out (i.e., when the parameter is set to "ON"), the intermediate image is generated in step 418 in the signal processing unit 214 on the basis of the size of the intermediate image set in the intermediate image generation parameters. The intermediate image may be generated by sampling pixels per interval determined on the basis of the size of the original image and the size of the intermediate image, or may be generated using a known reduction algorithm by a reduction ratio determined on the basis of the size of the original image and the size of the intermediate image.

For example, if the size of the original image is 1920 pixels×1440 pixels and the size of the intermediate image is 640×480 pixels, 1920/640=3 and 1440/480=3, so the intermediate image can be generated by sampling 1 pixel at (3−1=) 2-pixel intervals vertically and horizontally. When a reduction algorithm is used, a reduction ratio of ⅓ is applied.

In step 420, the data of the intermediate image is compressed by any reduction algorithm such as JPEG, and the intermediate image is stored in the internal memory 216 in step 422.

When it has been determined in step 416 that generation of the intermediate image is not to be carried out (i.e., when the parameter is set to "OFF"), the intermediate image is not generated. In any case, in step 424, desired signal processing is carried out, the original image is compressed in step 426 by any data reduction algorithm such as JPEG, and the original image is stored in the internal memory 216 in step 428.

The compressed data of the thumbnail image, the original image, and the intermediate image stored in the internal memory 216 in steps 428, 214, and 422 are configured to the format of the image file 50 shown in FIG. 5 and stored in a medium, such as the memory card 250, together with the header section and the tag section.

Because whether or not generation of the intermediate image is to be conducted is determined and, when it is to be generated, the size thereof is determined on the basis of the intermediate image generation parameter, the size of the intermediate image section 508 of the image file 50 shown in FIG. 5 becomes variable. For example, with respect to a case where the size of the intermediate image is set to be 1280 pixels×960 pixels, the size of the intermediate image section is 0.56 times when set to 960 pixels×720 pixels, and the size of the intermediate image section is 0.25 times when set to 640 pixels×480 pixels. When setting is carried out so that the intermediate image is not to be generated, the intermediate image section 508 becomes unnecessary.

In this manner, the digital camera of the present embodiment presets whether or not generation of the intermediate image is to be conducted and, when it is to be generated, presets the size thereof, generates the intermediate image on the basis of that setting at the time of image photographing and, when it is not set that generation of the intermediate image is to be carried out, does not generate the intermediate image. That is, the user can optionally set the size of the image file stored in the medium and can adjust the time necessary for the storing. Because the photographing interval is proportional to the time necessary for generating and storing the image file, the user can thus adjust the time of the photographing interval.

It should be noted that it is preferable for the size of the intermediate image set by "AUTO" to be 1/3 the size of the original image. This is because, when the size of the intermediate image is 1/3 the size of the original image, the user can commonly determine whether or not the image is in focus.

Although whether or not the thumbnail image is to be generated is set in the image photographing processing of FIG. 4, the present invention is not limited thereto. The thumbnail image may also be generated unconditionally.

Also, when generation of the thumbnail image is to be carried out on the basis of the thumbnail image generation parameter, the present invention may be configured so that the size thereof can be set. In this case, the size of the thumbnail section 506 of the image file shown in FIG. 5 becomes variable.

In this manner, the digital camera of the present embodiment presets whether or not generation of not only the intermediate image but also the intermediate image is to be conducted and, when it is to be generated, presets the size thereof, generates the thumbnail image on the basis of that setting at the time of image photographing and, when it is not set that generation of the thumbnail image is to be carried out, does not generate the thumbnail image. That is, the user can optionally set the size of the image file stored in the medium and can adjust the time necessary for the storing. Because the photographing interval is proportional to the time necessary for generating and storing the image file, the user can thus adjust the time of the photographing interval.

It should be noted that the generation parameters of the intermediate image and the thumbnail image may be set by the personal computer 252 connected via the external interface 238 and sent to the digital camera 10, or may be preset in the memory card 250 and sent to the digital camera 10 when the memory card 250 is loaded in the memory card socket 218. Thus, the image size can be selected not by selecting a size displayed on the menu screen but by selecting any numerical value using a keyboard or the like, and methods of generating the intermediate image and the thumbnail image more detailed setting can be carried out. Also, the image file 50 may be stored in the internal memory 216.

What is claimed is:

1. A digital camera comprising:
   a photographing component for photographing a subject;
   a setting component for setting whether a generation of an intermediate image is to be carried out, and for setting a resolution of an original image, so that if the generation of the intermediate image is to be carried out, the setting component sets a resolution of the intermediate image based on a set resolution of the original image;
   an intermediate image generating component for generating, when the intermediate image generation is set by the setting component, the intermediate image for verifying a state of focus, having the resolution which is between a resolution of the original image and a resolution of a thumbnail image; and
   a storage component for storing an original image photographed by the photographing component and, if generated, the generated intermediate image,
   wherein, when the set resolution of the original image is changed to a new set resolution, the setting component automatically changes the resolution of the intermediate image based on the new set resolution of the original image.

2. The digital camera of claim 1, wherein the setting component sets a size of the intermediate image to be generated.

3. The digital camera of claim 1, wherein a size of the intermediate image is approximately 1/3 the size of the original image.

4. The digital camera of claim 1, wherein the setting component further sets whether a generation of a thumbnail image is to be carried out,
   wherein a thumbnail image generating component, for generating the thumbnail image when thumbnail image generation is set by the setting component, is disposed, and
   wherein the storage component stores, if generated, the generated thumbnail image.

5. The digital camera of claim 4, wherein a setting component sets a size of the thumbnail image to be generated.

6. The digital camera of claim 4, wherein the thumbnail image is generated by sampling pixels at predetermined intervals.

7. The digital camera of claim 4, wherein the thumbnail image is generated using an image reduction algorithm.

8. A photographing system comprising:
   a digital camera; and
   a machine-readable medium encoded with a set of medium-readable instructions for use on a personal computer,
   wherein the digital camera includes:
      a photographing component for photographing a subject;
      a setting component for setting whether a generation of an intermediate image is to be carried out, and for setting a resolution of an original image, so that if the generation of the intermediate image is to be carried out, the setting component sets a resolution of the intermediate image based on a set resolution of the original image;
      an intermediate image generating component for generating, when intermediate image generation is set by the setting component, the intermediate image, to verify a state of focus, having the resolution between a resolution of the original image and a resolution of a thumbnail image;
      a storage component for storing an original image photographed by the photographing component and the generated intermediate image;
      a communicating component for communicating with the personal computer,
   wherein the personal computer is used to set the setting component via the communicating component, and
   wherein, when the set resolution of the original image is changed to a new set resolution, the setting component automatically changes the resolution of the intermediate image based on the new set resolution of the original image.

9. The photographing system of claim 8, wherein the setting component sets a size of the intermediate image to be generated.

10. The photographing system of claim 8, wherein a size of the intermediate image is approximately 1/3 the size of the original image.

11. The photographing system of claim 8, wherein the setting component sets whether a generation of a thumbnail image is to be carried out,
    wherein a thumbnail image generating component, for generating the thumbnail image when thumbnail image generation is set by the setting component, is disposed in the digital camera, and wherein the storage component stores the generated thumbnail image.

12. The photographing system of claim 11, wherein the setting component sets a size of the thumbnail image to be generated.

13. The digital camera of claim 11, wherein the thumbnail image is generated by sampling pixels at predetermined intervals.

14. A method for photographing with a digital camera, the method comprising:
 photographing a subject;
 determining whether or not a generation of an intermediate image is set to be carried out;
 setting a resolution of an original image, so that if the generation of the intermediate image is to be carried out, setting a resolution of the intermediate image based on a set resolution of the original image;
 generating the intermediate image for verifying a state of focus, having the resolution between a resolution of the original image and a resolution of a thumbnail image when the intermediate image generation is set;
 storing the photographed original image and, if generated, the generated intermediate image, and
 wherein, when the set resolution of the original image is changed to a new set resolution, the resolution of the intermediate image is automatically changed based on the new set resolution of the original image.

15. The method for photographing with a digital camera of claim 14, further comprising: setting a size of the intermediate image to be generated is set in setting whether or not generation of an intermediate image is to be carried out.

16. The method for photographing with a digital camera of claim 14, wherein a size of the intermediate image is approximately ⅓ the size of the original image.

17. The method for photographing with a digital camera of claim 14, wherein in determining whether or not generation of an intermediate image is set to be carried out, whether or not generation of a thumbnail image is to be carried out is set,
 wherein the thumbnail image is generated when thumbnail image generation is set in setting whether or not generation of an intermediate image is to be carried out, and
 wherein the generated thumbnail image is stored in storing the photographed original image and the generated intermediate image.

18. The method for photographing with a digital camera of claim 17, wherein a size of the thumbnail image to be generated is set in setting whether or not generation of an intermediate image is to be carried out.

19. The method for photographing with a digital camera of claim 17, wherein the thumbnail image is generated by sampling pixels at predetermined intervals.

20. The method for photographing with a digital camera of claim 17, wherein the thumbnail image is generated using an image reduction algorithm.

* * * * *